United States Patent
Shtalenkov et al.

(10) Patent No.: US 11,295,000 B1
(45) Date of Patent: Apr. 5, 2022

(54) STATIC CONFIGURATION OF ACCELERATOR CARD SECURITY MODES

(71) Applicant: Xilinx, Inc., San Jose, CA (US)

(72) Inventors: Dmitriy Shtalenkov, Foster City, CA (US); Krishnakumar Sugumaran, Waterloo (CA); Maurice Penners, Boulder Creek, CA (US)

(73) Assignee: Xilinx, Inc., San Jose, CA (US)

( * ) Notice: Subject to any disclaimer, the term of this patent is extended or adjusted under 35 U.S.C. 154(b) by 2 days.

(21) Appl. No.: 17/034,868

(22) Filed: Sep. 28, 2020

(51) Int. Cl.
*G06F 21/35* (2013.01)
*G06F 9/50* (2006.01)
*H04L 67/1097* (2022.01)

(52) U.S. Cl.
CPC ........... *G06F 21/35* (2013.01); *G06F 9/5027* (2013.01); *H04L 67/1097* (2013.01)

(58) Field of Classification Search
CPC ... G06F 21/35; G06F 9/5027; H04L 67/1097; H04L 49/9047; H04L 72/1268; H04W 72/0413
See application file for complete search history.

(56) References Cited

U.S. PATENT DOCUMENTS

| | | | |
|---|---|---|---|
| 5,850,151 A | 12/1998 | Cliff | |
| 6,025,737 A | 2/2000 | Patel | |
| 6,246,260 B1 | 6/2001 | Mendel | |
| 6,493,862 B1 | 12/2002 | Young | |
| 6,526,557 B1 | 2/2003 | Young | |
| 6,957,340 B1 | 10/2005 | Pang | |
| 7,058,177 B1 | 6/2006 | Trimberger | |
| 7,117,373 B1 | 10/2006 | Trimberger | |
| 7,143,384 B1 | 11/2006 | Young | |
| 7,240,218 B2 | 7/2007 | Kean | |
| 7,385,532 B1 | 6/2008 | Schumacher | |
| 7,424,658 B1 | 9/2008 | Ghosh Dastidar | |
| 7,606,362 B1 | 10/2009 | Streicher | |
| 7,725,738 B1 | 5/2010 | Langhammer | |
| 7,747,025 B1 | 6/2010 | Trimberger | |
| 7,788,502 B1 | 8/2010 | Donlin | |
| 7,856,546 B2 | 12/2010 | Casselman | |
| 8,022,724 B1 | 9/2011 | Jenkins, IV | |
| 8,438,436 B1 | 5/2013 | Baker | |
| 8,484,671 B1* | 7/2013 | Kahn | H04N 5/913 725/25 |
| 8,539,254 B1 | 9/2013 | Bridgford | |
| 8,576,641 B1 | 11/2013 | Trimberger | |
| 8,966,253 B1 | 2/2015 | Trimberger | |

(Continued)

OTHER PUBLICATIONS

Xilinx, "Bitstream Security, eFUSEs, and Device DNA," Chap. 8 of UltraScale Architecture Configuration, User Guide UG570 (v1.10), 16 pg., Feb. 21, 2019, Xilinx, Inc, San Jose, CA, USA.

(Continued)

*Primary Examiner* — Vernal U Brown
(74) *Attorney, Agent, or Firm* — Kevin T. Cuenot

(57) ABSTRACT

An accelerator card can include a read-only memory configured to store a security identifier in a designated field therein and a satellite controller configured to read the security identifier in response to a reset event. The satellite controller is configured to select, based on the security identifier, a security mode from a plurality of security modes and implement the selected security mode in the accelerator card.

20 Claims, 5 Drawing Sheets

(56) References Cited

U.S. PATENT DOCUMENTS

| | | |
|---|---|---|
| 8,983,073 B1 | 3/2015 | Peterson |
| 9,054,859 B1 | 6/2015 | Streicher |
| 9,218,505 B1 | 12/2015 | Wesselkamper |
| 9,270,274 B1 | 2/2016 | Reese |
| 9,722,613 B1 | 8/2017 | Schultz |
| 10,031,760 B1 | 7/2018 | Santan |
| 10,044,514 B1 | 8/2018 | Peterson |
| 10,305,511 B1 | 5/2019 | Schultz |
| 10,489,609 B1 | 11/2019 | McGrath |
| 2002/0199110 A1 | 12/2002 | Kean |
| 2004/0181686 A1 | 9/2004 | Krause |
| 2007/0288765 A1 | 12/2007 | Kean |
| 2010/0132018 A1* | 5/2010 | Takala ............... H04L 9/3265 726/5 |
| 2011/0314298 A1 | 12/2011 | Zimmer et al. |
| 2013/0159725 A1 | 6/2013 | Koo |
| 2017/0155510 A1 | 6/2017 | Cloostermans |
| 2018/0082083 A1 | 3/2018 | Smith |
| 2018/0232254 A1 | 8/2018 | Mohan |
| 2019/0050351 A1 | 2/2019 | Sahu et al. |
| 2020/0125772 A1 | 4/2020 | Volos et al. |
| 2020/0153623 A1 | 5/2020 | Asanghanwa |
| 2020/0153756 A1* | 5/2020 | Thyamagondlu ....... G06F 13/28 |
| 2021/0042252 A1 | 2/2021 | Thyamagondlu |

OTHER PUBLICATIONS

Adam Duncan, FPGA Bitstream Security: A Day in the Life, 2019 IEEE International Test Conference (ITC) pp. 1-10 (Year: 2019).

* cited by examiner

400

| Read, using a satellite controller of an accelerator card, a security identifier from a designated field of a read-only memory of the accelerator card in response to a reset condition
402 |

| Select, based on the security identifier and using the satellite controller, a security mode from a plurality of security modes for the accelerator card
404 |

| Implement the selected security mode within the accelerator card.
406 |

FIG. 4

STATIC CONFIGURATION OF ACCELERATOR CARD SECURITY MODES

TECHNICAL FIELD

This disclosure relates to the use of peripheral devices with computer systems and, more particularly, to configuration of security modes for accelerator card type peripheral devices.

BACKGROUND

Hardware acceleration refers to a technology in which tasks of a computing system are offloaded from the central processing unit (CPU) to other hardware in the system. The other hardware may be specifically tailored or suited for performing the offloaded tasks. The hardware to which the tasks are offloaded may be referred to as an accelerator card.

The accelerator card is communicatively linked to the computer system through a communication bus. Often, the accelerator card has an edge connector that fits into an available bus slot of the computer system. Still, accelerator cards may be communicatively linked to the computer system by any of a variety of different communication buses or other communication technologies.

SUMMARY

An accelerator card can include a read-only memory configured to store a security identifier in a designated field therein and a satellite controller configured to read the security identifier in response to a reset event. The satellite controller is capable of selecting, based on the security identifier, a security mode from a plurality of security modes and implementing the selected security mode in the accelerator card.

A method of configuring a security mode for an accelerator card can include reading, using a satellite controller of the accelerator card, a security identifier from a designated field of a read-only memory of the accelerator card in response to a reset event, selecting, based on the security identifier and using the satellite controller, a security mode from a plurality of security modes for the accelerator card, and implementing the selected security mode within the accelerator card.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates another example method of static configuration of security modes in an accelerator card.

DETAILED DESCRIPTION

Figure 1:
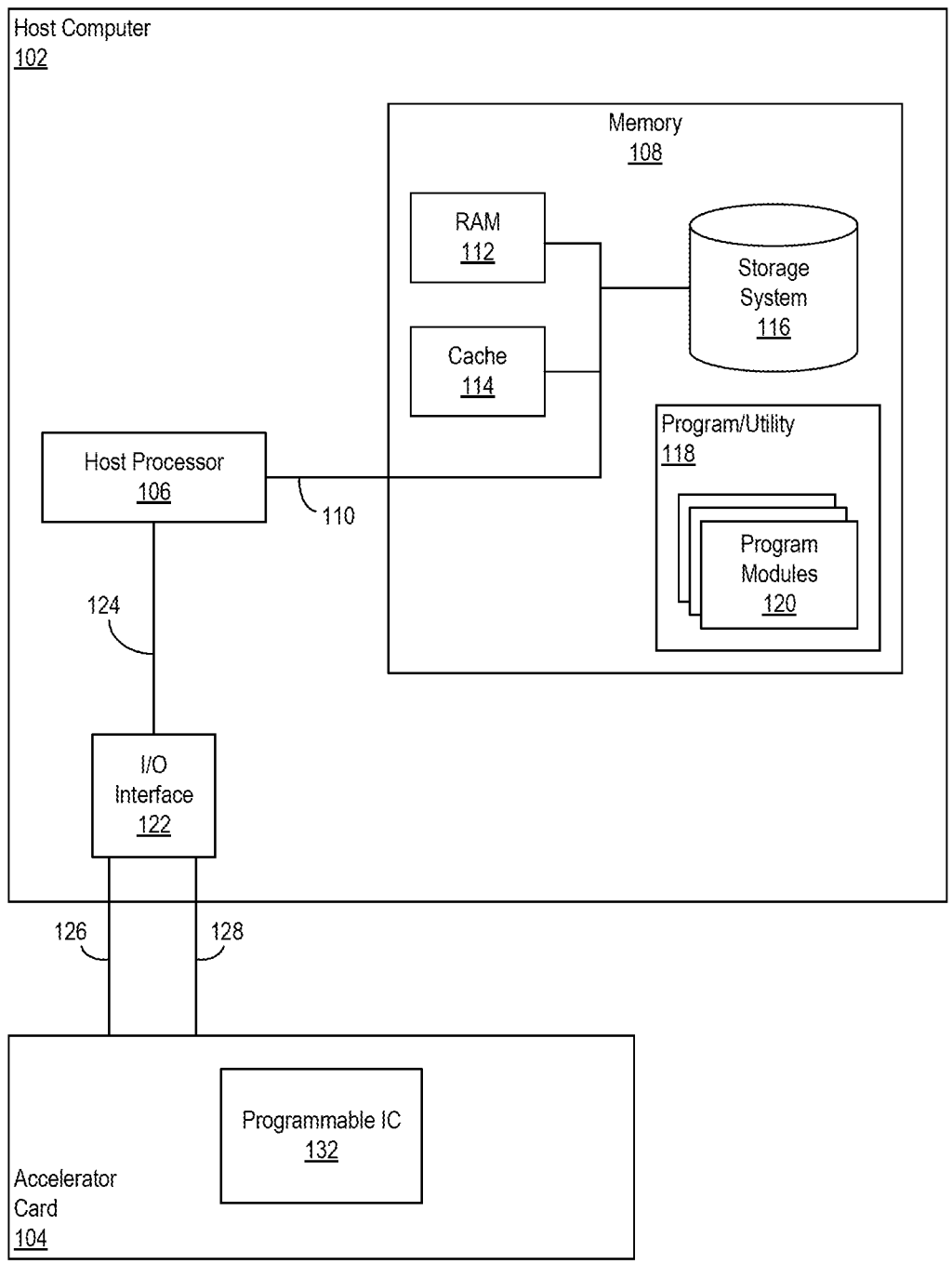
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the use of peripheral devices with computer systems and, more particularly, to configuration of security modes for accelerator card type peripheral devices. A modern computer system is capable of utilizing a peripheral device often referred to as an accelerator card to obtain one or more benefits that may not be attained relying solely on the central processing unit (CPU) of the computer system. These benefits may include, but are not limited to, faster operation, reduced power consumption, and redundancy.

A Root of Trust refers to a set of functions provided by a trusted component of a computer system that are always trusted by the computer system's operating system. A computer system is capable of extending the Root of Trust to certain peripheral devices such as accelerator cards. Different computer systems, however, may utilize different Roots of Trust where each different Root of Trust may have a different path for extending the Root of Trust to the peripheral device.

In accordance with the inventive arrangements described within this disclosure, a peripheral device such as an accelerator card is capable of automatically detecting a required security role for the peripheral device. For example, in response to a reset event, the peripheral device is capable of automatically determining a security mode to be implemented in the peripheral device. The security mode that is implemented may depend on the Root of Trust for the particular host computer with which the peripheral device is used.

In one aspect, the peripheral device is capable of selecting a security mode from a plurality of security modes based on a security identifier stored within a memory of the peripheral device. The security identifier indicates the Root of Trust for the host computer. The peripheral device is capable of automatically configuring itself by implementing the selected security mode. By implementing the selected security mode, the peripheral device is capable of responding to the Root of Trust for the host computer over a correct path, executing any necessary security protocols, and subsequent to execution of any such security protocols, starting one or more application workloads.

In an example implementation, the peripheral device is statically configured with a selected security mode. Static configuration of a security mode means that the peripheral device selects and implements the security mode in response to a reset event. A reset event, for example, may include the peripheral device performing a boot process. For example, in response to powering on or being reset, the peripheral device is capable of selecting a security mode and implementing that security mode.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a host computer 102 coupled to an accelerator card 104. Accelerator card 104 is an example of peripheral device of host computer 102.

The components of computer 102 may include, but are not limited to, a host processor 106 (e.g., one or more CPUs), a memory 108, and a bus 110 that couples various system components including memory 108 to host processor 106. Host processor 106 may be implemented as any of a variety of processors capable of executing program code. Example processor types include, but are not limited to, processors having an x86 type of architecture (IA-32, IA-64, etc.), Power Architecture, ARM processors, and the like.

Processor 106 communicates with memory 108 via bus 110. For example, bus 110 may be implemented as a memory bus. Computer 102 typically includes a variety of computer readable media. Such media may be any of a variety of media that may be accessed by host computer 102 and may include any combination of volatile media, non-volatile media, removable media, and/or non-removable media.

Memory 108 is an example of at least one computer program product having a set (e.g., at least one) of program modules (e.g., program code) configured to carry out functions and/or operations described within this disclosure in relation to host processor 106. For example, memory 108 may include computer readable media in the form of volatile memory, such as random-access memory (RAM) 112 and/or cache memory 114. Computer 102 may also include other removable/non-removable, volatile/non-volatile computer system storage media. For example, storage system 116 may include a disk drive capable of reading from and writing to a non-removable, non-volatile magnetic and/or solid-state media included therein (e.g., a "hard drive."). Storage system 116 also may include one or more disk drives for reading from and writing to a removable, non-volatile media that may be magnetic, solid state, and/or optical. The disk drives may be connected to bus 110 by one or more data media interfaces.

Program/utility 118 may include one or more program modules 120. Program modules 120, being stored in memory 108, may include, but are not limited to, an operating system, one or more application programs (e.g., user applications), other program modules, and/or program data. Program modules 120 generally carry out the functions and/or methodologies as described herein at least with respect to operations performed by host processor 106.

Program/utility 118 is executable by host processor 106. Program/utility 118 and any data items used, generated, and/or operated upon by host processor 106 are functional data structures that impart functionality when employed by host processor 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 122 communicatively linked to host processor 106 via a bus 124. Bus 124 may be an expansion bus or an I/O bus. I/O interface(s) 122 allow computer 102 to couple to and communicate with a variety of peripheral devices such as accelerator card 104. Host computer 102 may be coupled to other devices (not shown) such as a keyboard, pointing device, and/or display via other I/O interfaces. Examples of I/O interface 122 may include, but are not limited to, network cards, modems, network adapters, hardware controllers, etc.

Bus 124 may be implemented as any of a variety of communication bus structures. By way of example, and not limitation, such bus structures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, or a PCI Express (PCIe) bus.

In the example of FIG. 1, host computer 102 is coupled to accelerator card 104 via a communication channel 126. Communication channel 126 may be established by I/O interface 122 on bus 124. In an example implementation, I/O interface 122 through which host computer 102 communicates with accelerator card 104 is a PCIe adapter. Accelerator card 104 may be implemented as a circuit board that couples to host computer 102. Accelerator card 104, for example, may be inserted into an available card slot, e.g., an available bus and/or PCIe slot, of host computer 102. In the example of FIG. 1, communication channel 126 is an "in-band" communication channel.

In one or more example implementations, where host computer 102 includes a Baseboard Management Controller (BMC) (not shown), host computer 102 may also be communicatively linked to accelerator card 104 by way of a communication channel 128. Communication channel 128 may be implemented as an out-of-band (OOB) communication channel that communicatively links the BMC with accelerator card 104. In one aspect, communication channel 128 may be implemented through the same physical connector as communication channel 126. Still, communication channel 128 is physically distinct and separate from communication channel 126.

In the example of FIG. 1, accelerator card 104 includes a programmable IC 132. Programmable IC 132 includes programmable circuitry (e.g., programmable logic). It should be appreciated that, while not explicitly shown, programmable IC 132 may include one or more hardwired circuit blocks that may be used in cooperation with the programmable circuitry. As an example, programmable IC 132 may be implemented as a field programmable gate array (FPGA). In one aspect, programmable IC 132 may be implemented as a System-on-Chip (SoC) that includes different subsystems that are capable of operating cooperatively with one another. For example, programmable IC 132 may include a processor and/or a processor array subsystem, a programmable logic subsystem, and/or one or more other specialized hardwired circuit blocks. Accelerator card 104 also may include other components not illustrated in FIG. 1 that are coupled to programmable IC 132 such as volatile memory and/or non-volatile memory.

FIG. 1 is not intended to suggest any limitation as to the scope of use or functionality of the examples described herein. Host computer 102 is an example of computer hardware (e.g., a system) that is capable of performing various operations described within this disclosure relating to accelerator card 104 and/or programmable IC 132. Accelerator card 104 is provided for purposes of illustration and is not intended to be limiting of the inventive arrangements. A more detailed example of accelerator card 104 is described in connection with FIG. 2.

In one aspect, host computer 102 represents a server. For example, host computer 102 may be practiced as a stand-alone device, as a bare metal server, or as part of a cluster of computing devices. In another aspect, computing environment 100 may represent a datacenter with host computer 102 being practiced therein. A datacenter refers to a dedicated space such as a room or building that houses computing facilities such as, for example, servers, routers, switches, firewalls, telecommunications equipment, and/or storage systems. The datacenter often includes supporting components like backup equipment, fire suppression facilities, and air conditioning. A datacenter may be private or shared. Typically, the datacenter restricts access to the computing hardware to only authorized personnel. In one example implementation, computing environment 100 may represent a hyperscale datacenter.

In an example implementation, computer environment 102 may represent a distributed cloud computing environment with host computer 102 being practiced therein. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments, edge computing environments, and/or datacenters, generally support the FPGA-as-a-Service (FaaS) model. In the FaaS model, user functions are hardware accelerated as circuit designs implemented within programmable ICs operating under control of the host computer. Other examples of cloud computing models are described in the National Institute of Standards and Technology (NIST) and, more particularly, the Information Technology Laboratory of NIST.

It should be appreciated that an actual datacenter and/or distributed cloud computing environment may include more computers than shown wherein one or more or all of the computers has one or more of accelerator cards coupled thereto.

In an example implementation, accelerator card 104 is capable of automatically, statically configuring a security mode therein. Accelerator card 104 is capable of implementing a security mode that is compatible with the Root of Trust infrastructure provided by host computer 102. This allows accelerator card 104 to interact with the Root of Trust of host computer 102 over the correct signal path.

Figure 2:
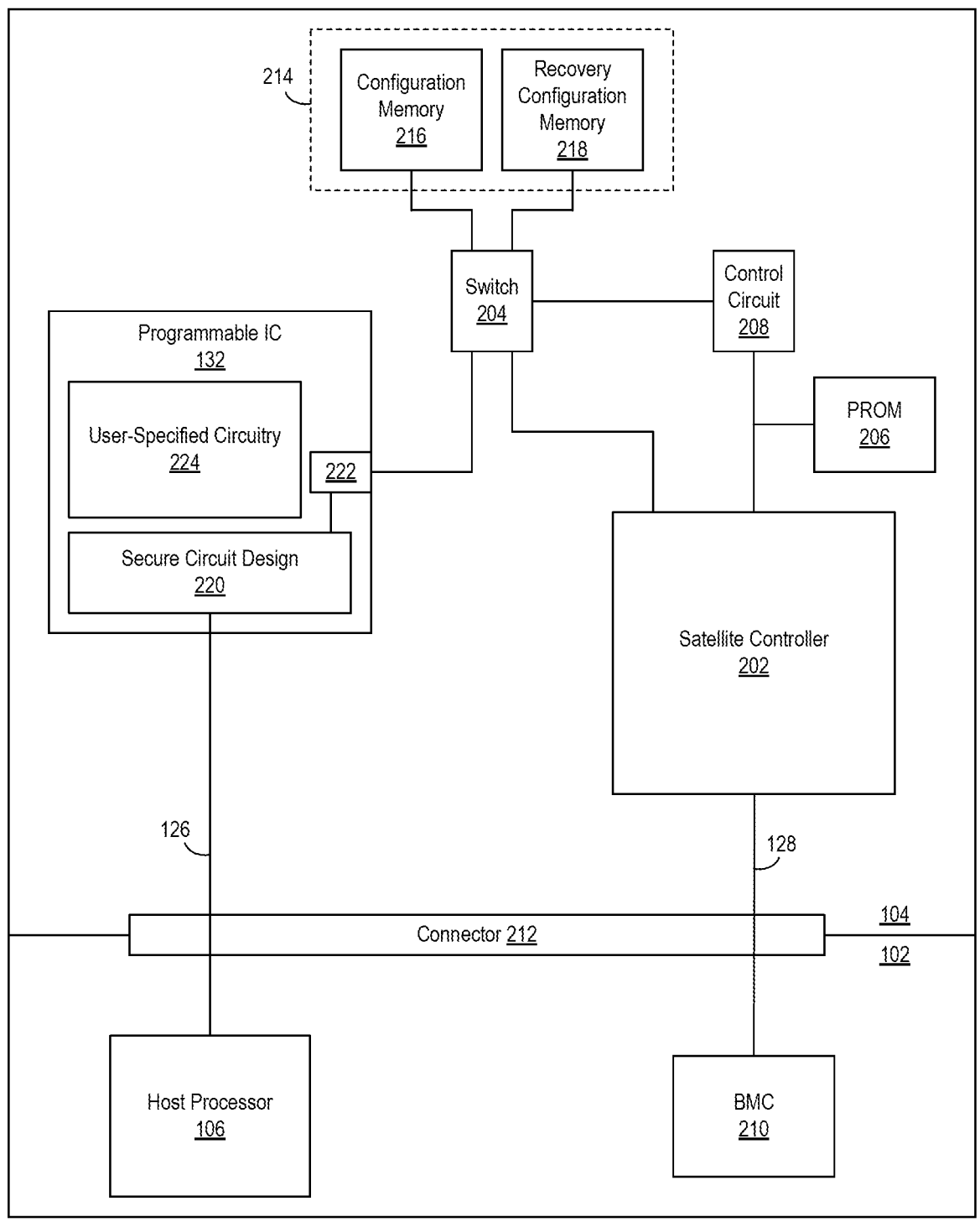
FIG. 2 illustrates another example of the computing environment of FIG. 1.

FIG. 2 illustrates another example of computing environment 100 including host computer 102 and accelerator card 104. In addition to programmable IC 132, accelerator card 104 includes a satellite controller 202 coupled to a switch 204, a programmable read-only memory (PROM) 206, and a control circuit 208. In one example, satellite controller 202 may be implemented as a processor capable of executing program code. In another example, satellite controller 202 may be implemented as dedicated circuitry.

Accelerator card 104 also may include random-access memory (not shown) that is coupled to programmable IC 132. Satellite controller 202 may be coupled to a port of switch 204 via a Serial Peripheral Interface (SPI) contained therein. Satellite controller 202 also is capable of communicating with, and providing control signals to, control circuit 208 and reading from PROM 206 via an Inter-Integrated Circuit (I2C) interface contained therein. It should be appreciated that the particular buses, communication channels, and/or interfaces described herein as used by components of accelerator card 104 are provided for purposes of illustration and not limitation. Equivalent and/or suitable interfaces other than those described may be used.

In the example of FIG. 2, host computer 102 includes a BMC 210. For example, FIG. 2 may illustrate a motherboard, or portion of a motherboard, of host computer 102. in the example, BMC 210 may be implemented on the same motherboard of host computer 102 as host processor 106. For purposes of illustration, other components of host computer 102 previously described in connection with FIG. 1 are not illustrated in FIG. 2. Host processor 106 is coupled to programmable IC 132 via communication channel 126. Communication channel 126 extends through connector 212. Connector 212 may be a PCIe connector. BMC 210 is coupled to satellite controller 202 via communication channel 128. Communication channel 128 also extends through connector 212. In one aspect, communication channel 128 is implemented as a System Management Bus (SMBus).

In an example implementation, PROM 206 may be implemented as an electrically erasable PROM. PROM 206 may include a variety of data that is stored therein at the time accelerator card 104 is manufactured and prior to being released in the field. This data may include field replaceable unit (FRU) data. The FRU data may include Other Equipment Manufacturer (OEM) data. In an example implementation, a security identifier (ID) may be stored in the FRU OEM data, e.g., in an FRU EOM field.

In an example implementation, the security ID specifies the Root of Trust for the accelerator card and, as such, a particular path for extending the Root of Trust. For purposes of illustration, the security ID may specify a first value indicating a first, or in-band (IB), security mode to be implemented in accelerator card 104. In the IB security mode, the Root of Trust is host processor 106. In the IB security mode, the path that is enabled for extending the Root of Trust is communication channel 126, which is an IB communication channel. Alternatively, the security ID may specify one or more other values that indicate a second, or OOB security mode to be implemented in accelerator card 104. In the OOB security mode, the Root of Trust is BMC 210. In the OOB security mode, the path that is enabled for extending the Root of Trust is communication channel 128, which is an OOB communication channel. In the examples described herein, the IB channel is used by host processor 106 to communicate with accelerator card 104 for purposes of offloading tasks to acceleration card 104 from host computer 102, e.g., for performing workloads. The OOB communication channel is not used by accelerator card 104 to perform workloads from host computer 102.

Switch 204 is coupled to memories 214. Memories 214 may be implemented as non-volatile memories. In the example of FIG. 2, memories 214 include a configuration memory 216 and a recovery configuration memory 218. Configuration memory 216 may be a primary configuration memory in that programmable IC 132 boots from configuration memory 216. Recovery configuration memory 218 may be used as a backup of configuration memory 216 in certain situations. In one aspect, configuration memory 216 and recovery configuration memory 218 each may be implemented as a flash memory. Memories 214, for example, may store configuration data for programmable IC 132. Switch 204 is configurable by way of control signals provided from control circuit 208 to provide programmable IC 132 with either read-only access to configuration memory 216 or read and write access to configuration memory 216 based on the security mode that is implemented in accelerator card 104. In the case where switch 204 provides programmable IC 132 with read and write access to configuration memory 216, switch 204 prohibits or turns off access of satellite controller 202 to memories 214.

In the example, programmable IC 132 includes an interface 222 that is connected to a port of switch 204 thereby allowing programmable IC 132 to read from memories 214 or read and write configuration memory 216. In an example implementation, interface 222 is a Quad Serial Peripheral Interface (QSPI). Switch 204 may be configured so that programmable IC 132 is able to read from recovery configuration memory 218 regardless of the particular security mode that is implemented on accelerator card 104. In one or more example implementations, depending on the configuration of switch 204 via control circuit 208, programmable IC 132 is capable of reading and/or writing to either one or both of memories 214.

In response to a reset event for accelerator card 104, satellite controller 202 reads the security ID from PROM 206. A reset event may be any occurrence of the accelerator card and the satellite controller therein restarting and/or booting. Examples of a reset event may include a hard reset where accelerator card 104 is powered off and then on, a soft reset of accelerator card 104, and an initial powering on of accelerator card 104.

Based on the value of the security ID, satellite controller 202 sends commands to control circuit 208 causing control circuit 208 to configure switch 204 with a particular configuration. For example, in the case where the security ID indicates the IB security mode where the Root of Trust is host processor 106, satellite controller 202 instructs control circuit 208 to configure switch 204 to provide programmable IC 132 with read and write access to configuration memory 216. Satellite controller 202 further instructs control circuit 208 to configure switch 204 to prevent satellite controller 202 from accessing memories 214. In that case, switch 204 effectively disconnects satellite controller 202 from memories 214. In response to receiving the instructions from satellite controller 202, control circuit 208 generates the control signals necessary to configure switch 204 as described.

In the IB security mode, programmable IC 132 is given read and write access to configuration memory 216. Accordingly, programmable IC 132 is capable of booting, at least initially, using a boot image read from configuration memory 216. From time-to-time within this disclosure, the boot image of programmable IC 132 may be referred to as "firmware" of programmable IC 132. The boot image, once loaded into programmable IC 132, may implement a secure circuit design 220 in programmable IC 132. Secure circuit design 220 is capable of communicating with host processor 106 via communication channel 126. For example, secure circuit design 220 may implement a communication interface such as a PCIe endpoint in programmable IC 132. Secure circuit design 220 is capable of responding to further instructions received from host processor 106 relating to implementation of security protocols within programmable IC 132 and/or accelerator card 104.

In the case of the IB security mode, secure circuit design 220 is capable of differentiating between access rights of user applications executing on host processor 106 and the Root of Trust (operating system) executing on host processor 106. Secure circuit design 220, for example, is capable of authenticating further configuration data that may be received from host processor 106 acting as the Root of Trust. For example, secure circuit design 220 may receive another boot image from host processor 106 acting as the Root of Trust. In response to receiving the boot image for configuring programmable IC 132, secure circuit design 220 is capable of authenticating the boot image. For example, secure circuit design 220 is capable of generating a hash value of the received boot image and comparing the hash value with a known or predetermined hash value. Secure circuit design 220 is capable of writing the authenticated configuration data, or boot image, to configuration memory 216. As such, secure circuit design 220, operating under control of host processor 106, is capable of updating configuration memory 216 with configuration data received from host processor 106. By giving secure circuit design 220 authority to write to configuration memory 216, the Root of Trust is extended from host processor 106 to secure circuit design 220.

In the IB security mode, satellite controller 202 does not communicate with BMC 210 over communication channel 128. That is, satellite controller 202 may be placed in a mode where satellite controller 202 is not responsive to commands or communications received from BMC 210 over communication channel 128. In the IB security mode, satellite controller 202 effectively disconnects from programmable IC 132 and/or memories 214 at least until the next reset event for accelerator card 104.

In the case where the security ID indicates the OOB security mode where the Root of Trust is BMC 210, satellite controller 202 instructs control circuit 208 to configure switch 204 to provide programmable IC 132 with read-only access to configuration memory 216. Satellite controller 202 further instructs control circuit 208 to configure switch 204 to provide satellite controller 202 with read and write access to configuration memory 216. In response to receiving the instructions from satellite controller 202, control circuit 208 generates the control signals necessary to configure switch 204 as described. In one or more example implementations, depending on the configuration of switch 204 via control circuit 208, satellite controller 202 is capable of reading and/or writing to either one or both of memories 214.

In the OOB security mode, programmable IC 132 is given read-only access to configuration memory 216. Accordingly, programmable IC 132 is capable of booting, at least initially, using a boot image read from configuration memory 216. The boot image, once loaded into programmable IC 132, may implement secure circuit design 220 in programmable IC 132. It should be appreciated that the particular implementation of secure circuit design 220 may be different for the IB security mode and the OOB security mode. That is, a different secure circuit design may be stored in configuration memory 216, read therefrom, implemented in programmable IC 132 for the IB security mode than is the case for the OOB security mode. As an example, in the IB security mode case, secure circuit design 220 may be capable of performing authentication of certain configuration data received from host processor 106 and writing authenticated configuration data to configuration memory 216, whereas secure circuit design 220 may not be capable of performing such functions in the OOB security mode case.

In the OOB security mode, satellite controller 202 does communicate with BMC 210 over communication channel 128. That is, satellite controller 202 is placed in a mode where satellite controller 202 is responsive to commands or communications received from BMC 210, which is the Root of Trust, over communication channel 128. Satellite controller 202 is capable of responding to further instructions received from BMC 210 relating to implementation of security protocols within programmable IC 132 and/or accelerator card 104.

In one aspect, OOB security mode means that satellite controller 202 is first authenticated by the BMC 210. Once authenticated by the BMC 210, satellite controller 202 is capable of authenticating further configuration data that may be received from BMC 210 acting as the Root of Trust. For example, satellite controller 202 may receive another boot image for programmable IC 132 from BMC 210 acting as the Root of Trust. In response to receiving the boot image, satellite controller 202 is capable of authenticating the boot image. For example, satellite controller 202 is capable of generating a hash value from the received boot image and comparing the hash value with a known or predetermined hash value. Satellite controller 202 is capable of writing the authenticated configuration data, or boot image, to configuration memory 216. As such, the programmable IC 132 does not perform authentication of the boot image or write any such data to configuration memory 216. By giving secure satellite controller 202 authority to write to configuration memory 216, the Root of Trust is extended from BMC 210 to satellite controller 202.

In one or more example implementations, the OOB security mode may implement particular routines to configure accelerator card 104 based on the particular customer or user using accelerator card 104. For example, the security ID may specify a particular security mode, and also specify a particular set of routines to be executed by satellite controller 202. As an example, the security ID may include one or more least significant bits that indicate the particular entity that will be using accelerator card 104. The routines that are executed may be specific to the particular user of accelerator card 104.

As an example, satellite controller 202 may execute particular routines that are specific to the particular hyperscale vendor using accelerator card 104. Satellite controller 202 may include a plurality of routines that correspond to a plurality of different hyperscale vendors. A plurality of different security IDs may indicate the OOB security mode, where each such different security ID corresponds to a different vendor. Upon reading the security ID and implementing the OOB security mode, satellite controller 202 is capable of executing only those security routines, e.g., selected ones, of the plurality of routines associated with the security ID. For example, only those security routines that correspond to the hyperscale vendor indicated by the security ID are executed or implemented by satellite controller 202.

In the example of FIG. 2, secure circuit design 220 may be considered a "golden" or trusted circuit design used to boot programmable IC 132. Secure circuit design 220 allows either host processor 106 or BMC 210 to perform the remainder of the configuration. As noted, the particular version or implementation of secure circuit design 220 may vary based on the particular security mode implemented by accelerator card 104. Secure circuit design 220 may be updated by the Root of Trust once accelerator card 104 is in the field.

Once programmable IC 132 boots with secure circuit design 220 implemented therein and any security related instructions from the Root of Trust having been executed, programmable IC 132 is in a known good state. At that point, programmable IC 132 may be loaded with application configuration data that implements user-specified circuitry 224 therein regardless of the particular security mode implemented. Application configuration data is to be distinguished from a boot image received from the Root of Trust. Application configuration data and data to be operated on as part of performing a workload once user-specified circuitry 224 is implemented in programmable IC 132 is provided via communication channel 126 from host processor 106.

The examples described within this disclosure allow the same accelerator card to be used in different computing environments. For example, accelerator card 104 need only be loaded with a particular secure ID at the time of manufacture to support an OEM type of framework that uses the IB security mode or a hyperscale type of framework that uses the OOB security mode. In the case where the IB security mode is implemented, the host computer may or may not have a BMC, for example. The inventive arrangements described herein allow one model of accelerator card to support two different Root of Trust frameworks. Two different physical implementations of accelerator card 104 need not be created to support the different Root of Trust frameworks described.

Figure 3:
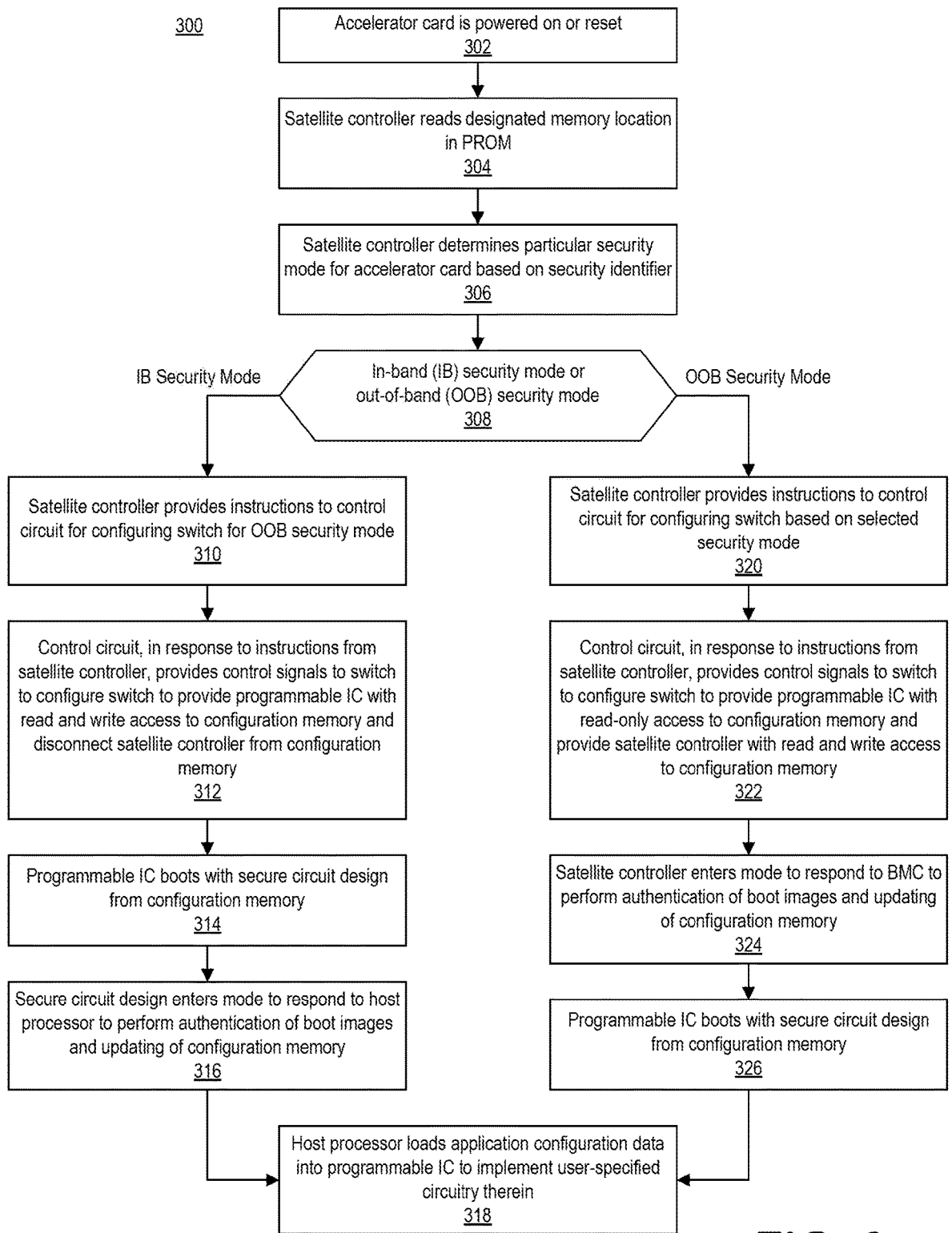
FIG. 3 illustrates an example method of static configuration of security modes in an accelerator card.

FIG. 3 illustrates an example method 300 of static configuration of security modes in an accelerator card. The accelerator card may be implemented as described in connection with FIGS. 1 and 2.

In block 302, accelerator card 104 is powered on or reset in response to a reset event. In response to powering on or reset of accelerator card 104, satellite controller 202 boots. In block 304, satellite controller 202 reads the security ID from a designated or predetermined memory location in PROM 206. The security ID may be stored in PROM 206 at the time of manufacture of accelerator card 104.

As noted, the security ID indicates whether the IB security mode or the OOB security mode is to be implemented by accelerator card 104. The IB security mode recognizes one entity, e.g., host processor 106, as the Root of Trust. The OOB security mode recognizes another entity, e.g., BMC 210, as the Root of Trust. Each different Root of Trust utilizes a different signal path or framework for extending the Root of Trust.

In block 306, satellite controller 202 determines the particular security mode to be implemented in accelerator card 104 based on the security ID read from PROM 206. The security ID indicates, for example, either the IB security mode or the OOB security mode. As noted, the security ID may also specify a particular set of security protocols or operations that are to be performed by satellite controller 202 in the case of the OOB security mode. In response to determining that the security ID indicates the IB security mode in block 308, method 300 continues to block 310. In response to determining that the security ID indicates the OOB security mode in block 308, method 300 continues to block 320.

Continuing with block 310, satellite controller 202 provides instructions to control circuit 208 for configuring switch 204. In block 312, control circuit 208, in response to the instructions from satellite controller 202, provides control signals to switch 204 to configure switch 204 to provide programmable IC 132 with read and write access to configuration memory 216 and disconnect satellite controller 202 from configuration memory 216 and backup configuration memory 218. For example, switch 204 may be configured to disable the port to which satellite controller 202 is connected.

In block 314, programmable IC 132 boots with secure circuit design 220, as read from configuration memory 216. That is, programmable IC 132 reads a boot image for secure circuit design 220 from configuration memory 216 and loads the boot image into programmable IC 132, thereby implementing secure circuit design 220 therein. In block 316, secure circuit design 220 enters a mode to respond to commands received from host processor 106 as the Root of Trust. Secure circuit design 220, for example, may implement a communication endpoint for communicating with host processor 106 over communication channel 126. Via channel 126, secure circuit design 220 is capable of receiving commands from host processor 106 that provide a boot image, instructions to authenticate the boot image, and instructions to store the authenticated boot image in configuration memory 216. Secure circuit design 220 is capable of further configuring programmable IC 132 and/or other components of accelerator card 104 to implement other security measures and/or protocols therein in response to commands received from host processor 106 over communication channel 126.

In block 318, host processor 106 is capable of loading application configuration data into programmable IC 132 over communication channel 126. The application configuration data, once loaded, implements user-specified circuitry 224 within programmable IC 132. The application configuration data is loaded into programmable IC 132 once the security configuration is complete, e.g., subsequent to implementing any security protocols and/or measures within programmable IC 132. With user-specified circuitry 224 implemented in programmable IC 132, host processor 106 may send data to programmable IC 132 to be operated on as part of a workload performed by user-specified circuitry 224.

Continuing with block 320, satellite controller 202 provides instructions to control circuit 208 for configuring switch 204. In block 322, control circuit 208, in response to instructions from satellite controller 202, provides control signals to switch 204 to configure switch 204 to provide programmable IC 132 with read-only access to configuration memory 216 and to provide satellite controller 202 with read and write access to configuration memory 216.

In block 324, satellite controller 202 enters a mode to respond to commands received from BMC 210. BMC 210, for example, may communicate with satellite controller 202 over communication channel 128. Via channel 128, satellite controller 202 is capable of receiving commands from BMC 210 that provide a boot image, instructions to authenticate the boot image, and instructions to store the authenticated boot image in configuration memory 216. Satellite controller 202 is further capable of implementing other security measures and/or protocols therein in response to commands received from BMC 210 over communication channel 128.

In block 326, programmable IC 132 boots with secure circuit design 220, as read from configuration memory 216. That is, programmable IC 132 reads a boot image for secure circuit design 220 from configuration memory 216 and loads the boot image into programmable IC 132, thereby implementing secure circuit design 220 therein.

After block 326, method 300 can continue to block 318 where user-specified circuitry 224 may be implemented in programmable IC 132 under control of host processor 106 and user-specified circuitry 224 may perform a workload as described.

FIG. 4 illustrates another example method 400 of static configuration of security modes in an accelerator card. The accelerator card may be implemented as described in connection with FIGS. 1 and 2.

In block 402, satellite controller reads a security identifier from a designated field of a read-only memory of the accelerator card in response to a reset event. In block 404, based on the security identifier, the satellite controller selects a security mode from a plurality of security modes for the accelerator card. In block 406, the selected security mode is implemented within the accelerator card.

The foregoing and other implementations can each optionally include one or more of the following features, alone or in combination. Some example implementations include all the following features in combination.

In one aspect, the plurality of security modes include an IB security mode and an OOB security mode.

The method can include, in response to implementing the IB security mode, designating a host processor of a host computer in communication with the accelerator card as a Root of Trust for the accelerator card.

The accelerator card can include a programmable IC and a configuration memory for the programmable IC.

The method can include, in response to implementing the IB security mode, enabling an IB communication channel between the host processor and the programmable IC for receipt of a boot image. The programmable IC is configured to authenticate the boot image and store the boot image in the configuration memory.

The method can include, in response to implementing the OOB security mode, designating a BMC of the host computer as the Root of Trust for the accelerator card.

The method can include, in response to implementing the OOB security mode, enabling an OOB communication channel between the satellite controller and the BMC for receipt of a boot image. The satellite controller can be configured to authenticate the boot image and store the boot image in the configuration memory.

The accelerator card can include a switch coupled to the configuration memory, the programmable IC, and the satellite controller, wherein the switch is configured by the satellite controller to provide the programmable IC or the satellite controller with write access to the configuration memory based on the selected security mode.

The method can include, in response to implementing the IB security mode, configuring the switch to provide the programmable IC with read and write access to the configuration memory and disconnect the satellite controller from the configuration memory.

The method can include, in response to implementing the OOB security mode, configuring the switch to provide the programmable IC with read-only access to the configuration memory and provide the satellite controller with read and write access to the configuration memory.

In another aspect, the read-only memory may be preloaded with the security identifier and is readable only by the satellite controller.

In one or more example implementations, the IB security mode may be used with OEM server infrastructures where the servers are on-premise. Consider an example where an OEM server infrastructure enables the accelerator card to perform a particular function such as live video streaming. In that case, the IB security mode may be used where the Root of Trust is extended from the server (e.g., the host processor) to a sudo role on the operating system. A sudo role refers to a computer operating system feature that allows a user to run a program with the security privileges of another user.

In the case where the accelerator card provides live video streaming in a public cloud computing environment, e.g., a hyperscale computing environment, the OOB security mode may be used. In that case, the Root of Trust is the BMC located on the server as opposed to the host processor. Using the host processor in a public cloud computing environment as the Root of Trust may not be secure since external users may be offered access to the live video streaming service on the server host in the public cloud.

In accordance with the inventive arrangements described herein, the OOB security mode is capable of supporting a variety of commands that may be issued from the BMC. The satellite controller, for example, may be responsive to such commands from the BMC once the OOB security mode is implemented in the accelerator card. These commands support secure firmware updates (e.g., updating of configuration memory with a different boot image).

The following are example commands that may be supported by the satellite controller.

Read accelerator card security status information. This command is a read command that, when executed by the satellite controller, provides information about the write protect status, the access mode, and the boot image authentication status for each configuration device (e.g., configuration memory 216 and/or recovery configuration memory 218).

Selection of a default boot device. This command is a write command providing the option to choose one configuration device as the default boot device from which programmable IC 132 boots on each power up. For example, the default boot device may be set using this command to configuration memory 216 or to recovery configuration memory 218.

Configure security settings on a chosen configuration device. This command is a write command that provides the option to apply any of the available security settings on the accelerator card to a chosen configuration device. Security settings options include different modes of SPI access and write enable/disable of configuration memory 216 and/or recovery configuration memory 218.

Authentication of satellite controller firmware and execute a secure firmware update for the satellite controller. This refers to a collection of read and write commands that enable authentication of firmware for the satellite controller and the updating of the firmware for the satellite controller via the OOB communication channel. As an example, the authentication may include default AES or a choice of encryption/decryption and CRC checks during the firmware update.

Secure firmware update of the main configuration device. This refers to a collection of read and write commands that enable the secure firmware update of configuration memory 216 and/or recovery configuration memory 218. In response to receiving such command(s), the satellite controller checks the security ID from the PROM and confirms that updating of the configuration memory is allowed. Only upon successful verification of the security ID are the write commands in this category enabled. The commands within this category include status reads, transfer of boot image payload, and CRC checks. Internally within the satellite controller, these commands trigger corresponding actions for the satellite controller to perform to write the boot image to the correct sector of the configuration memory, perform a CRC comparison on the boot image, and retry in case of failure.

Authentication of the main configuration device content. This refers to a collection of read and write commands that enable the complete authentication of boot images in configuration memory 216 and/or recovery configuration 218. In one or more example implementations, the particular authentication scheme or protocol that is used may vary with the particular security ID that is read from the PROM. For example, any of a plurality of different security IDs may be specified in PROM 206, where each of the plurality of security IDs specify the OOB security mode and each security ID specifies a different predefined authentication scheme that is implemented by the satellite controller. The satellite controller is capable of supporting multiple different authentication schemes, but implements one authentication scheme at runtime based on the security ID. The authentication status may be provided by a status command. In the case of an authentication failure, the satellite controller is capable of completely erasing unauthenticated content.

Transfer of authenticated content from the main configuration device to a secondary configuration device. This command enables the duplication of content from a main configuration device such as configuration memory 216 to a recovery device such as recovery configuration device 218. This command may be provisioned in hardware and supported by firmware to achieve fault tolerance. In case of corruption or loss of data in configuration memory 216, programmable IC 132 may be configured from recovery configuration memory 218. To enable this redundancy feature, the satellite controller copies the configuration data, or boot image, from configuration memory 216 to recovery configuration memory 218 thereby eliminating the need to perform relatively slower updates for each configuration memory separately over the OOB communication channel, which operates at a slower speed than the IB communication channel. The duplication of content is enabled only in response to successful authentication by the satellite controller of the configuration data stored in configuration memory 218. In one aspect, authentication information of each configuration device may be stored in the satellite controller's internal non-volatile memory for cross-verification during each command operation.

In one or more example implementations, the commands described above may be executed in the background. That is, programmable IC 132 is capable of continuing to operate while one or more of the commands described above may be executed in the background. For example, programmable IC 132 is capable of booting from authenticated content stored in the main configuration device and begin workload execution (e.g., performing tasks offloaded by the host computer using the user-specified circuitry implemented therein). While programmable IC 132 performs workload execution, the satellite controller is capable of acquiring write access to the main configuration device and performing a secure update of the data stored in the main configuration device as a background operation. After successful update, e.g., storing of an authenticated boot image for programmable IC 132, the accelerator card may be rebooted with new firmware. Upon reboot, programmable IC 132 loads the new boot image thereby allowing the update of the secure circuit design implemented in programmable IC 132.

Firmware for the satellite controller enables or disables security features based on the security ID read from PROM 206. The security levels and the implementation details of each security level may be predefined and assigned respective ones of the security IDs. The foregoing commands may only be enabled as per the requirements of the security ID. Each of the commands may have a custom configuration or implementation that is used based on the security ID that is written to PROM 206.

Figure 5:
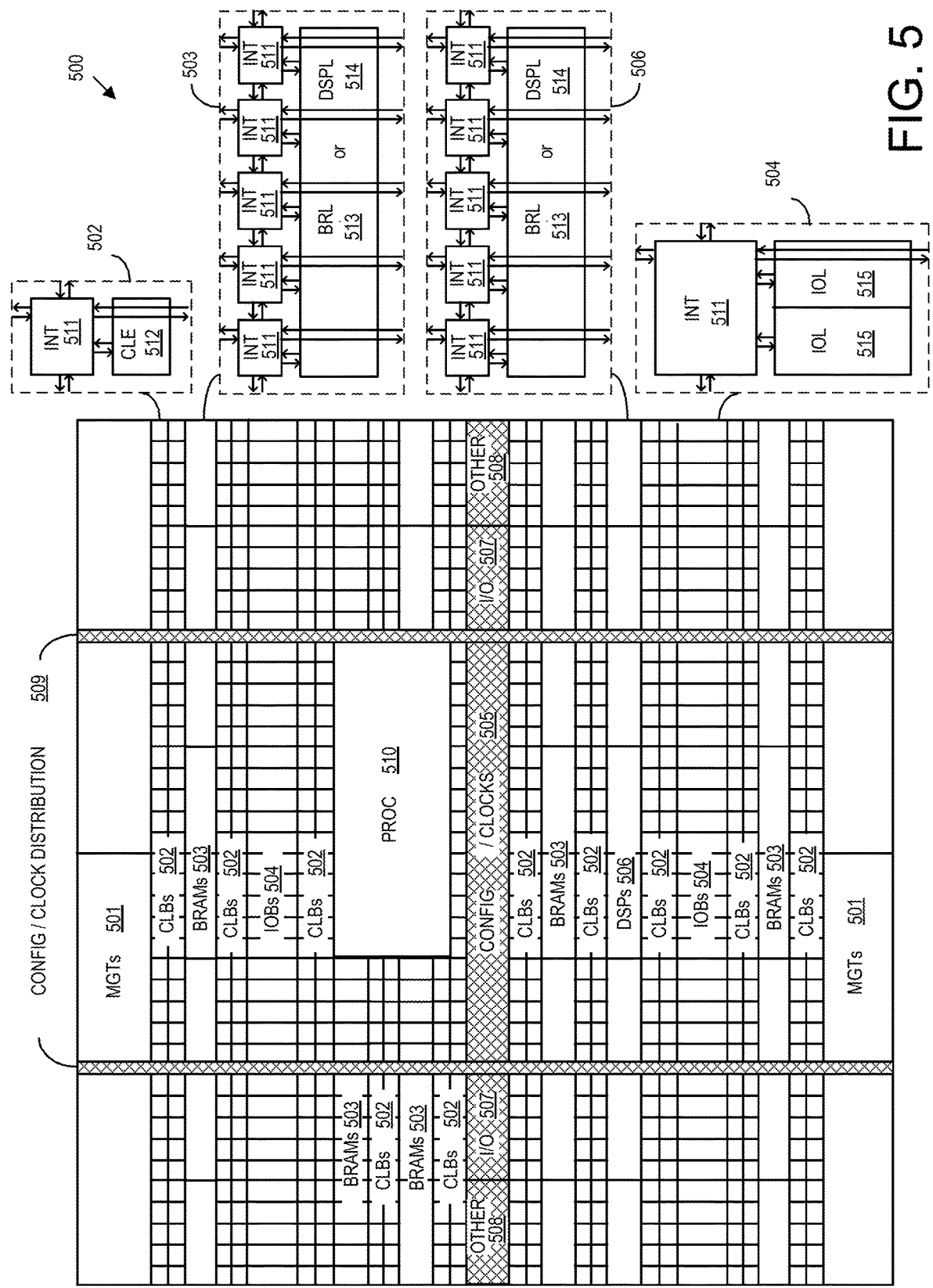
FIG. 5 illustrates an example architecture for an integrated circuit (IC).

FIG. 5 illustrates an example architecture 500 for an IC. In one aspect, architecture 500 may be implemented within a programmable IC. For example, architecture 500 may be used to implement a field programmable gate array (FPGA). Architecture 500 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 500 includes several different types of programmable circuit, e.g., logic, blocks. For example, architecture 500 may include a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized I/O blocks 507 (e.g., configuration ports and clock ports), and other programmable logic 508 such as digital clock managers, analog-to-digital converters, system monitoring logic, and so forth.

In some ICs, each programmable tile includes a programmable interconnect element (INT) 511 having standardized connections to and from a corresponding INT 511 in each adjacent tile. Therefore, INTs 511, taken together, implement the programmable interconnect structure for the illustrated IC. Each INT 511 also includes the connections to and from the programmable logic element within the same tile, as shown by the examples included at the right of FIG. 5.

For example, a CLB 502 may include a configurable logic element (CLE) 512 that may be programmed to implement user logic plus a single INT 511. A BRAM 503 may include a BRAM logic element (BRL) 513 in addition to one or more INTs 511. Typically, the number of INTs 511 included in a tile depends on the height of the tile. As pictured, a BRAM tile has the same height as five CLBs, but other numbers (e.g., four) also may be used. A DSP tile 506 may include a DSP logic element (DSPL) 514 in addition to an appropriate number of INTs 511. An 10B 504 may include, for example, two instances of an I/O logic element (IOL) 515 in addition to one instance of an INT 511. The actual I/O pads connected to IOL 515 may not be confined to the area of IOL 515.

In the example pictured in FIG. 5, a horizontal area near the center of the die, e.g., formed of regions 505, 507, and 508, may be used for configuration, clock, and other control logic. Vertical areas 509 extending from this horizontal area may be used to distribute the clocks and configuration signals across the breadth of the programmable IC.

Some ICs utilizing the architecture illustrated in FIG. 5 include additional logic blocks that disrupt the regular columnar structure making up a large part of the IC. The additional logic blocks may be programmable blocks and/or dedicated circuitry. For example, a processor block depicted as PROC 510 spans several columns of CLBs and BRAMs.

In one aspect, PROC 510 may be implemented as dedicated circuitry, e.g., as a hardwired processor, that is fabricated as part of the die that implements the programmable circuitry of the IC. PROC 510 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 510 may be omitted from architecture 500 and replaced with one or more of the other varieties of the programmable blocks described. Further, such blocks may be utilized to form a "soft processor" in that the various blocks of programmable circuitry may be used to form a processor that can execute program code as is the case with PROC 510.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 5 that are external to PROC 510 such as CLBs 502 and BRAMs 503 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 510.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 510 or a soft processor. In some cases, architecture 500 includes a dedicated configuration processor that loads the configuration bitstream to the appropriate configuration memory and/or processor memory. The dedicated configuration processor does not execute user-specified program code. In other cases, architecture 500 may utilize PROC 510 to receive the configuration bitstream, load the configuration bitstream into appropriate configuration memory, and/or extract program code for execution.

FIG. 5 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 5 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 510 within the IC are for purposes of illustration only and are not intended as limitations.

FIG. 5 is provided as an example implementation of programmable IC 132 and is not intended to be limiting of the types of ICs that may be implemented on an accelerator card for purposes of the inventive arrangements described herein. Other types of programmable ICs may be used. In some cases, the programmable IC 132 may include a hardened bus endpoint, e.g., a PCIe endpoint, for communicating with the host computer. In other cases, the bus endpoint may be implemented in programmable circuitry. This this regard, the secure circuit design may be implemented entirely in programmable logic in response to loading the boot image or partially in programmable logic and partially in one or more hardwired circuit blocks in response to loading the boot image. In some cases, the programmable IC may include a processor array that may operate in cooperation with other processors and/or subsystems (e.g., programmable logic) of the programmable IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. In some contexts, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if," "when," or "upon" means "in response to" or "responsive to," depending upon the context. As defined herein, the terms "responsive to" and "in response to" mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit. The processor may be hardwired or implemented using programmable logic.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

An accelerator card can include a read-only memory configured to store a security ID in a designated field therein and a satellite controller configured to read the security ID in response to a reset event. The satellite controller may be configured to select, based on the security identifier, a security mode from a plurality of security modes and implement the selected security mode in the accelerator card.

The foregoing and other implementations can each optionally include one or more of the following features, alone or in combination. Some example implementations include all the following features in combination.

In one aspect, the plurality of security modes include an IB security mode and an OOB security mode.

The IB security mode may designate a host processor of a host computer in communication with the accelerator card as a Root of Trust for the accelerator card. The OOB security mode may designate a BMC of the host computer as the Root of Trust for the accelerator card.

In another aspect, the accelerator card includes a programmable IC and a configuration memory for the programmable IC.

The IB security mode may enable an IB communication channel between the host processor and the programmable IC for receipt of a boot image. The programmable IC is configured to authenticate the boot image and store the boot image in the configuration memory.

The OOB security mode may enable an OOB communication channel between the satellite controller and the BMC for receipt of a boot image. The satellite controller is configured to authenticate the boot image and store the boot image in the configuration memory.

In another aspect, the accelerator card includes a switch coupled to the configuration memory, the programmable IC, and the satellite controller. The switch is configured by the satellite controller to provide the programmable IC or the satellite controller with write access to the configuration memory based on the selected security mode.

For example, in the IB security mode, the switch is configured to provide the programmable IC with read and write access to the configuration memory and disconnect the satellite controller from the configuration memory. In the 00B security mode, the switch is configured to provide the programmable IC with read-only access to the configuration memory and provide the satellite controller with read and write access to the configuration memory.

The accelerator card may include a control circuit configured to provide select signals to the switch in response to a control signal from the satellite controller.

In another aspect, the read-only memory is pre-loaded with the security identifier and is readable only by the satellite controller.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An accelerator card, comprising:
a read-only memory configured to store a security identifier in a designated field therein; and
a satellite controller configured to read the security identifier in response to a reset event; and
wherein the satellite controller is configured to select, based on the security identifier, a security mode from a plurality of security modes and implement the selected security mode in the accelerator card.

2. The accelerator card of claim 1, wherein the plurality of security modes include an in-band security mode and an out-of-band security mode.

3. The accelerator card of claim 2, wherein:
the in-band security mode designates a host processor of a host computer in communication with the accelerator card as a Root of Trust for the accelerator card; and
the out-of-band security mode designates a baseboard management controller of the host computer as the Root of Trust for the accelerator card.

4. The accelerator card of claim 3, further comprising:
a programmable integrated circuit; and
a configuration memory for the programmable integrated circuit;
wherein:
the in-band security mode enables an in-band communication channel between the host processor and the programmable integrated circuit for receipt of a boot image; and
the programmable integrated circuit is configured to authenticate the boot image and store the boot image in the configuration memory.

5. The accelerator card of claim 3, further comprising:
a programmable integrated circuit; and
a configuration memory for the programmable integrated circuit;
wherein:
the out-of-band security mode enables an out-of-band communication channel between the satellite controller and the baseboard management controller for receipt of a boot image; and
the satellite controller is configured to authenticate the boot image and store the boot image in the configuration memory.

6. The accelerator card of claim 2, further comprising:
a programmable integrated circuit;
a configuration memory for the programmable integrated circuit; and
a switch coupled to the configuration memory, the programmable integrated circuit, and the satellite controller, wherein the switch is configured by the satellite controller to provide the programmable integrated circuit or the satellite controller with write access to the configuration memory based on the selected security mode.

7. The accelerator card of claim 6, wherein:
in the in-band security mode, the switch is configured to provide the programmable integrated circuit with read and write access to the configuration memory and disconnect the satellite controller from the configuration memory.

8. The accelerator card of claim 7, wherein:
in the out-of-band security mode, the switch is configured to provide the programmable integrated circuit with read-only access to the configuration memory and provide the satellite controller with read and write access to the configuration memory.

9. The accelerator card of claim 6, further comprising:
a control circuit configured to provide select signals to the switch in response to a control signal from the satellite controller.

10. The accelerator card of claim 1, wherein the read-only memory is pre-loaded with the security identifier and is readable only by the satellite controller.

11. A method of configuring a security mode for an accelerator card, the method comprising:
reading, using a satellite controller of the accelerator card, a security identifier from a designated field of a read-only memory of the accelerator card in response to a reset event;
selecting, based on the security identifier and using the satellite controller, a security mode from a plurality of security modes for the accelerator card; and
implementing the selected security mode within the accelerator card.

12. The method of claim 11, wherein the plurality of security modes include an in-band security mode and an out-of-band security mode.

13. The method of claim 12, further comprising:
in response to implementing the in-band security mode, designating a host processor of a host computer in communication with the accelerator card as a Root of Trust for the accelerator card.

14. The method of claim 13, wherein the accelerator card includes a programmable integrated circuit and a configuration memory for the programmable integrated circuit, the method further comprising:
in response to implementing the in-band security mode, enabling an in-band communication channel between the host processor and the programmable integrated circuit for receipt of a boot image;
wherein the programmable integrated circuit is configured to authenticate the boot image and store the boot image in the configuration memory.

15. The method of claim 12, further comprising:
in response to implementing the out-of-band security mode, designating a baseboard management controller of the host computer as the Root of Trust for the accelerator card.

16. The method of claim 15, wherein the accelerator card includes a programmable integrated circuit and a configuration memory for the programmable integrated circuit, the method further comprising:

in response to implementing the out-of-band security mode, enabling an out-of-band communication channel between the satellite controller and the baseboard management controller for receipt of a boot image;

wherein the satellite controller is configured to authenticate the boot image and store the boot image in the configuration memory.

17. The method of claim 12, wherein the accelerator card includes:
a programmable integrated circuit;
a configuration memory for the programmable integrated circuit, and
a switch coupled to the configuration memory, the programmable integrated circuit, and the satellite controller, wherein the switch is configured by the satellite controller to provide the programmable integrated circuit or the satellite controller with write access to the configuration memory based on the selected security mode.

18. The method of claim 16, further comprising:
in response to implementing the in-band security mode, configuring the switch to provide the programmable integrated circuit with read and write access to the configuration memory and disconnect the satellite controller from the configuration memory.

19. The method of claim 16, further comprising:
in response to implementing the out-of-band security mode, configuring the switch to provide the programmable integrated circuit with read-only access to the configuration memory and provide the satellite controller with read and write access to the configuration memory.

20. The method of claim 11, wherein the read-only memory is pre-loaded with the security identifier and is readable only by the satellite controller.

* * * * *